US008225463B2

(12) United States Patent
Bourke et al.

(10) Patent No.: US 8,225,463 B2
(45) **Date of Patent: *Jul. 24, 2012**

(54) ROPE CLAMPING DEVICE

(76) Inventors: Timothy Bourke, Lake Orion, MI (US); Dorothy Bourke, Lake Orion, MI (US)

( * ) Notice: Subject to any disclaimer, the term of this patent is extended or adjusted under 35 U.S.C. 154(b) by 322 days.

This patent is subject to a terminal disclaimer.

(21) Appl. No.: 12/586,545

(22) Filed: Sep. 23, 2009

(65) Prior Publication Data

US 2010/0139051 A1 Jun. 10, 2010

Related U.S. Application Data

(60) Provisional application No. 61/192,894, filed on Sep. 23, 2008.

(51) Int. Cl.
*F16G 11/14* (2006.01)

(52) U.S. Cl. ................................ 24/132 AA; 24/115 H

(58) Field of Classification Search ................ 24/115 H, 24/115 R, 132 AA, 132 R, 68 SK, 712.1, 24/712.5, 712.6
See application file for complete search history.

(56) References Cited

U.S. PATENT DOCUMENTS

| | | | | |
|---|---|---|---|---|
| 888,893 | A | 5/1908 | Hayes | |
| 1,388,664 | A | 8/1921 | Officer | |
| 2,093,079 | A | 5/1934 | Hixon | |
| 3,865,461 | A * | 2/1975 | Ludwig | 439/463 |
| 4,134,183 | A | 1/1979 | Fischer | |
| 4,455,717 | A | 6/1984 | Gray | |
| 5,315,741 | A * | 5/1994 | Dubberke | 24/712.1 |
| 5,497,570 | A * | 3/1996 | Burshaw et al. | 38/140 |
| D399,045 | S * | 10/1998 | Liston | D2/978 |
| 6,260,241 | B1 | 7/2001 | Brennan | |
| 6,502,286 | B1 * | 1/2003 | Dubberke | 24/712.1 |

* cited by examiner

*Primary Examiner* — James Brittain
(74) *Attorney, Agent, or Firm* — John R. Benefiel

(57) ABSTRACT

A rope or line clamping device, including an assembly of two interfit tubular molded plastic members each having an internal web which are juxtaposed with each other and formed with elongated holes offset from the rotary axis of the members so that the holes progressively become more misaligned upon relative rotation of the members in a direction reducing the overlapping of the two holes, with a ratchet mechanism holding the members in relatively rotated positions to hold the rope or line segments clamped together until the ratchet mechanism is selectively released allowing reverse relative rotation.

7 Claims, 3 Drawing Sheets

ROPE CLAMPING DEVICE

This application claims the benefit of U.S. provisional application no. 61/192,894 filed on Sep. 23, 2008.

BACKGROUND OF THE INVENTION

This invention concerns ropes or lines as they are called on a boat, and more particularly securing ropes or lines to hold a load, moor a boat, tighten a guy line for a tent, etc. Traditionally, knots have been tied into the rope or line to form a loop but this is time consuming to tie and untie, and also requires a good knowledge of the proper knot for a given purpose.

While rope or wire clamping devices have been devised, these are not particularly suited to nautical application and are themselves sometimes inconvenient to clamp or release.

An object of the present invention to provide a simple but durable and weatherproof device for quickly securing two rope or segments of a rope together or releasing the same which is suitable for boating applications but also for a wide variety of other purposes.

SUMMARY OF THE INVENTION

The above recited object as well as other objects which will be apparent upon a reading of the following specification and claims are achieved by a rope or line clamping device comprised of two generally tubular rotary members snap fit together to be securely held assembled to each other while being relatively rotatable to each other. The members are preferably molded from a tough plastic material. Each member is formed with a radially extending internal web or wall which are juxtaposed next to each other. Each web has a hole formed therein, the holes each being an elongated such as of an oval shape not located at a location radially offset from the rotary axis of the members.

In one rotated position of the two members, the elongated holes are aligned with each other. The rope or line segments are inserted therein with the members then relatively rotated causing the holes to become increasingly offset with respect to each other, to in turn cause the size of a through opening defined by the overlapped areas of the holes to become progressively reduced.

This allows a clamping action to be carried out by edges of the two holes which compress the rope segments passed through both holes.

A ratcheting mechanism securely holds each of the members in relatively rotated position to prevent loosening once the rope segments have been clamped together.

A ratchet pawl on one member is radially deflectable inwardly to overrun in one rotational direction in which clamping is carried only and, by the grip of the user to selectively move teeth on a element out of engagement with ratchet teeth formed extending at least partially around the perimeter of the other member, allowing reverse releasing rotation between the two members as long as the pawl is held in its released position.

The pawl element is preferably integrally formed with the one member when molded and is moved radially by bending of a connecting leg within an opening in the one member.

DESCRIPTION OF THE DRAWING FIGURES

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
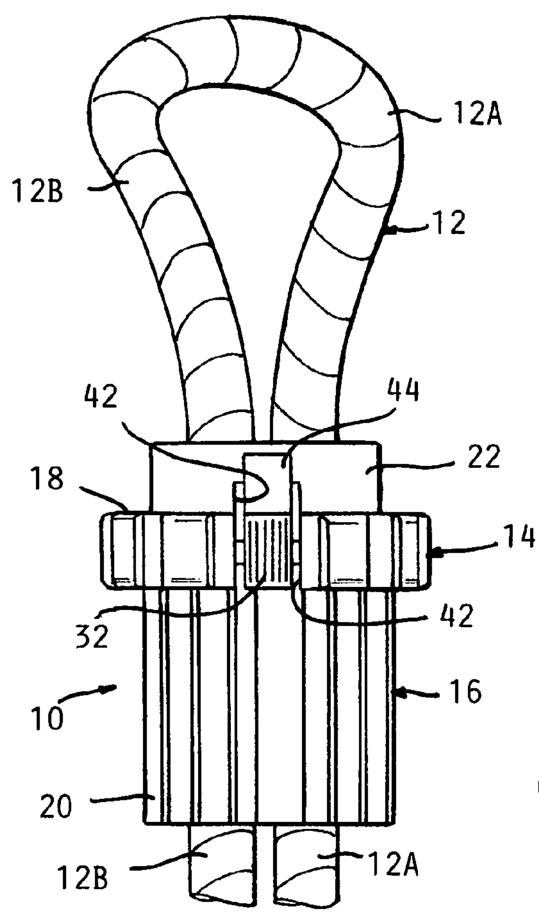
FIG. 1 is a side view of a clamping device according to the invention showing rope segments clamped together therein.
Figure 2:
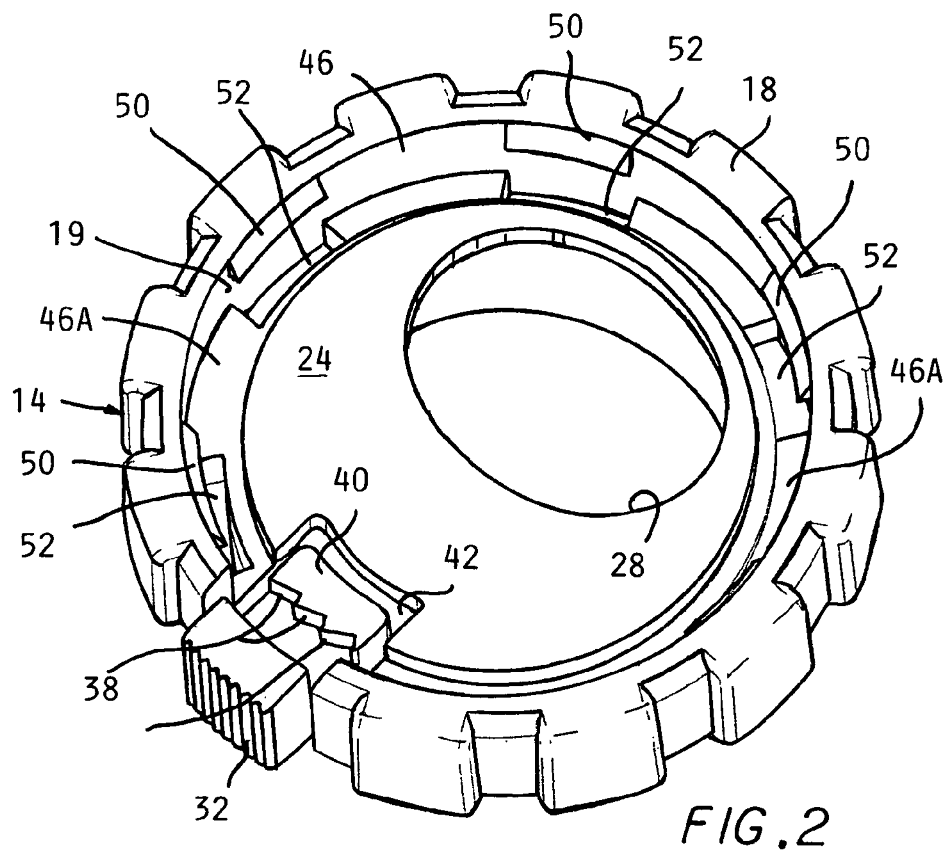
FIG. 2 is an enlarged pictorial view from the top of an outer member forming a part of the clamping device shown in FIG. 1, the outer member inverted from its position in FIG. 1.
Figure 3:
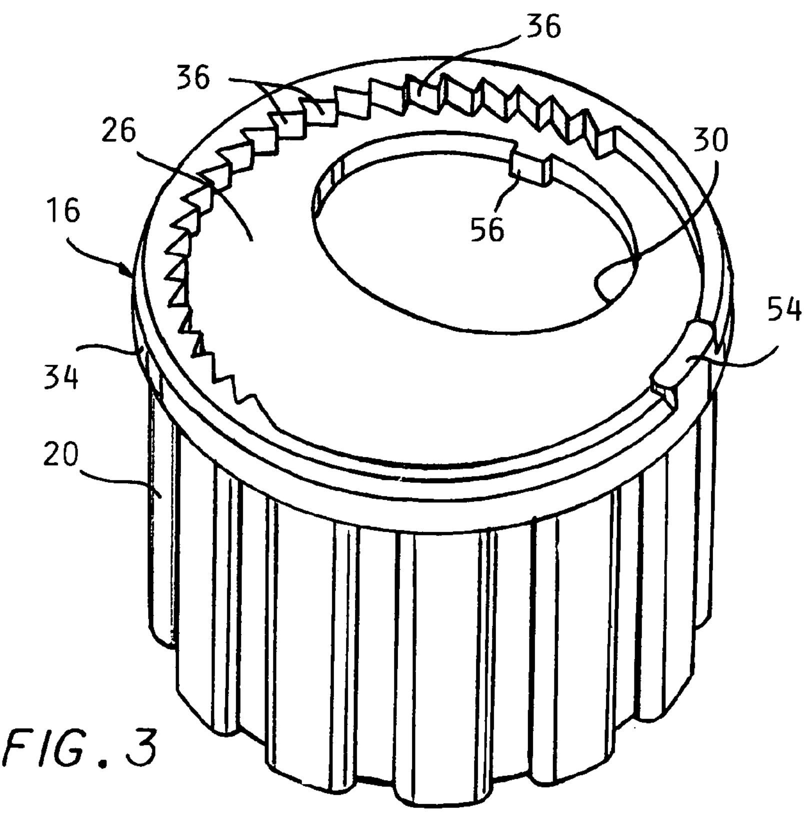
FIG. 3 is a pictorial view from the bottom of the inner member forming a part of the rope clamping device shown in FIG. 1.

Referring to the drawings and FIGS. 1-3, the rope or line clamping device 10 receives two segments of a rope 12 passing through the device 10, the rope doubled over to form a loop and are clamped together by limited relative rotation of two members assembled together, for convenient reference referred to as an outer member 14 and an inner member 16.

The outer member 14 has a ribbed rim 18 for convenient gripping, while the smaller diameter tubular body 20 of the inner member 16 is longer and ribbed also for a convenient gripping.

The outer member 14 also has a smaller diameter tubular body 22.

Both bodies 20 and 22 have an internal web or wall 24, 26 extending across the inside diameter thereof. Each web 24, 26 has a hole 28, 30 formed therein which are preferably of an elongated shape such as the oval shape shown.

The holes 28, 30 are both located offset from the center axis of the bodies by preferably the same distance and preferably are of the same shape so that in one relative position of the members 14, 16, the holes 28, 30 are aligned with each other.

This defines the maximum area through opening defined by the overlapped areas of the two holes 28, 30 and through which the two rope segments 12A, 12B of the rope 12 are inserted.

Figure 8:
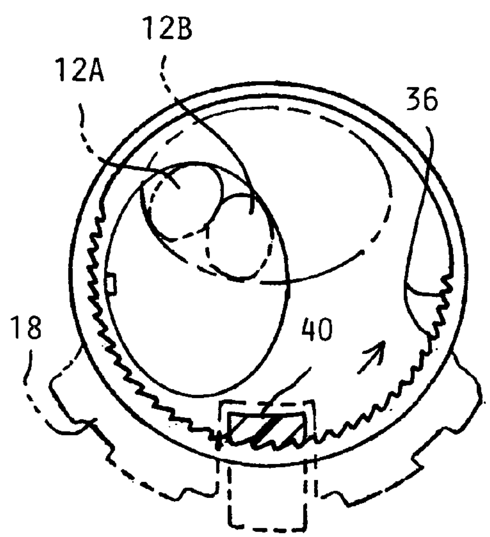
FIG. 8 is a top view as shown in FIG. 6 but with rope segments disposed therein and rotated to an intermediate clamping position.
Figure 9:
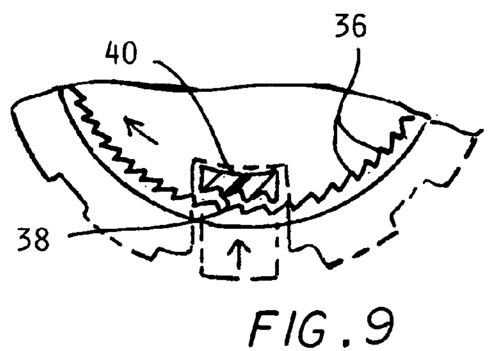
FIG. 9 is a fragmentary top view of the clamping device as shown in FIG. 8, but with the pawl element depressed to be disengaged from the ratchet teeth on the inner member.
Figure 10:
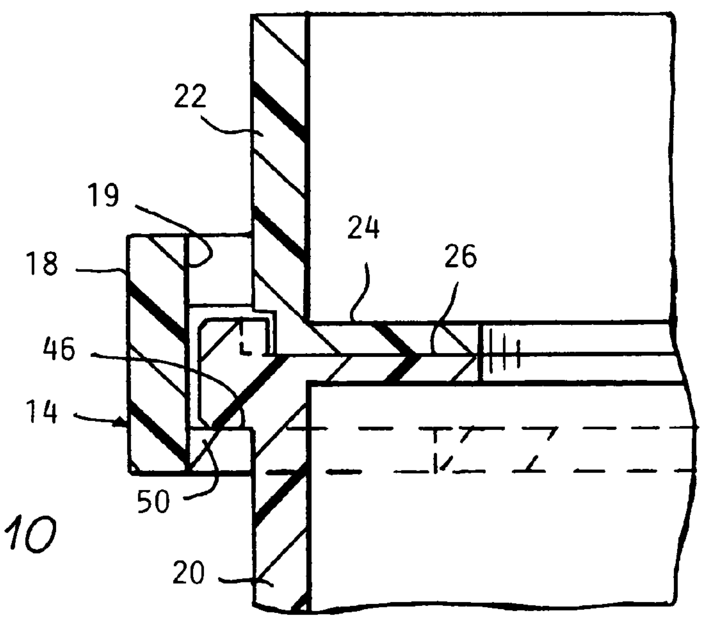
FIG. 10 is an enlarged fragmentary sectional view through a portion of the assembled inner and outer members.

When the two members are relatively rotated, as while gripping the ribbed rim 18 and body 20 in each hand, the holes 28, 30 become misaligned to a progressively greater extent, as seen in FIGS. 8 and 9 to reduce the area of overlap and thus to reduce the size of the through opening. This causes the edges of the holes 28, 30 to compress against the two rope segments 12A, 12B clamping them together. The thickness of the webs 24, 26 is sufficient as to not cut into the rope while creating sufficient pressure to securely engage the same, i.e., about an ⅛ inch thickness has been found to be satisfactory for this purpose.

The two members 14, 16 are preferably molded using a high strength plastic, such as 67% nylon filled with 33% fiberglass fibers. A UV protection additive is also desirable.

The two members 14, 16 have an internal ratchet mechanism described below which secures the two members 14, 16 in each advanced rotative position when rotated in one direction (clockwise in the Figures) from the fully open position shown in FIG. 4. The ratchet mechanism is able to be released by pushing on a release button 32 projecting beyond the rim 18 of the outer remember 14.

The body 20 of the inner member 16 has a slightly larger diameter rim 34 which projects above the internal web 26 and is formed for about half its inner surface with a series of internal ratchet teeth 36 which are shaped to mate with several ratchet teeth 38 facing out on a pawl 40 connected to the button 32.

The pawl 40 is molded integrally with the outer member 14 but fit within a recess 42 formed in the rim 18, the body 22 and web 24, cantilevered on the end of a leg 44 projecting axially from the body 22 adjacent the upper side of the recess 42. The leg 44 is thick enough (about 3/16 inches) and short enough to hold the ratchet teeth 36, 38 firmly in engagement, but still allow the pawl 40 to be deflected radially inward sufficiently to disengage the teeth 36, 38 when compressed by the user's grip allowing relative opening rotation of members 14, 16, and also to allow the ratchet teeth 36, 38 to overrun each other when relatively rotating the member 14, 16 in the clamping direction.

The inside diameter 19 of the rim 18 is formed with a groove 46 at the bottom of the rim 18. The groove 46 extends around to either side of a clearance space 48 formed between the ratchet button 32 and pawl 40.

This clearance enables the rim 34 to rotate through while allowing engagement of the ratchet teeth 36 and 38.

The two members 14 and 16 are snap fit together to partially overlap each other with the rim 34 (which is chamfered to make fitting easier) inserted into the inside diameter 19.

A series of spaced sloping shallow features 50 interact with the rim chamfer to enable the rim 34 to be compressed slightly and also expand the rim 18 during insertion until passing over the features 50. Thereafter, the rims 34, 18 snap back to their unstrained dimensions to be captured above the features 50, and the members 14, 16 are held together with assembly but able to relatively rotated to a limited extent as will be described below. In order to facilitate expansion of the rim 18 during assembly, a series of spaced windows 52 are formed therein around the perimeter thereof.

The relative rotation between the members 14, 16 is limited to about one half turn by an axially projecting tab 54 integral with the rim 34. The tab 54 rides in the groove 46 where it is deepest. The groove 46 has a segment 46A beyond the adjacent windows on either side of the pawl 40 which is shallower such that the tab 54 prevents relative rotation in either direction past the deep section of the groove 46.

Figure 6:
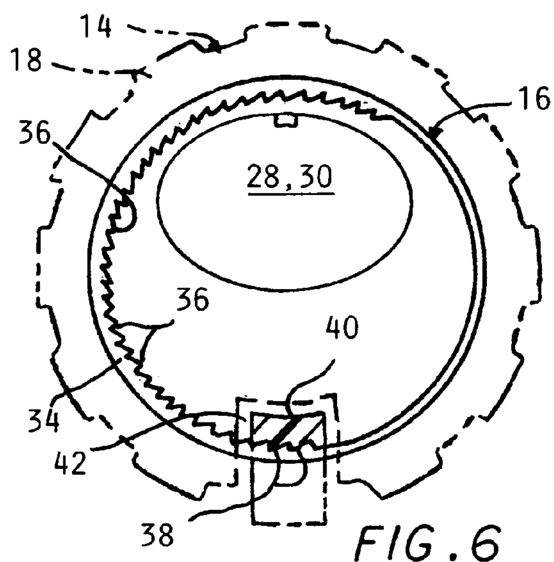
FIG. 6 is a top view of the clamping device as shown in FIG. 4 but with the outer member shown in phantom lines.
Figure 7:
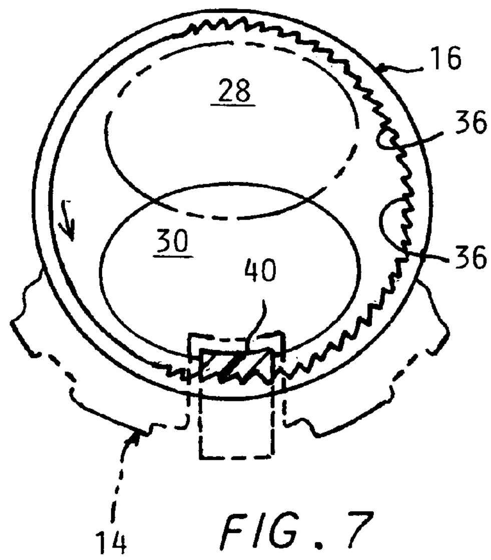
FIG. 7 is a top view of the clamping device as shown in FIG. 6 but rotatably advanced to the minimum through opening clamping position.

This prevents relative rotary movement of the members 14, 16 past the full open position in a counterclockwise direction (shown in FIG. 6) or past the most advanced clamped position in a clockwise direction (shown in FIG. 7).

Another tab 56 projects radially from the perimeter of the hole 30 at its midpoint. This tends to engage and move the rope segments 12A to a long ways juxtaposition within the holes 28, 30 as seen in FIG. 8 to insure a strong grip is achieved.

Figure 4:
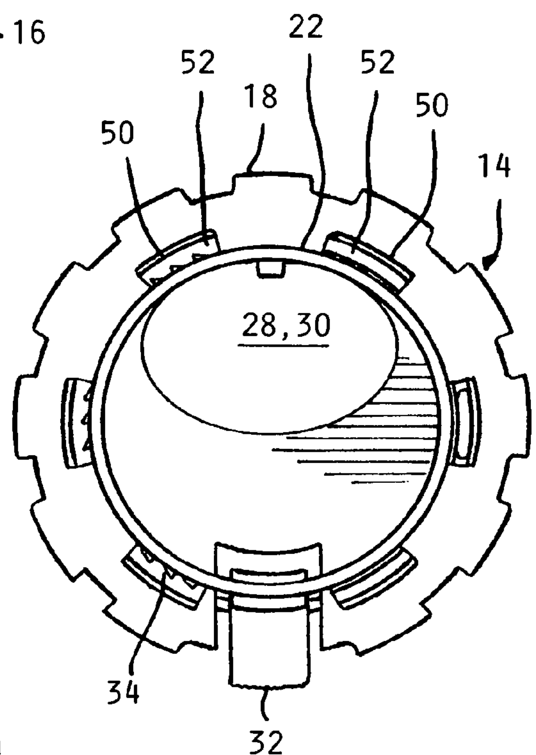
FIG. 4 is a top view of the clamping device shown in FIG. 1 in the fully open relative rotated position of the members.
Figure 5:
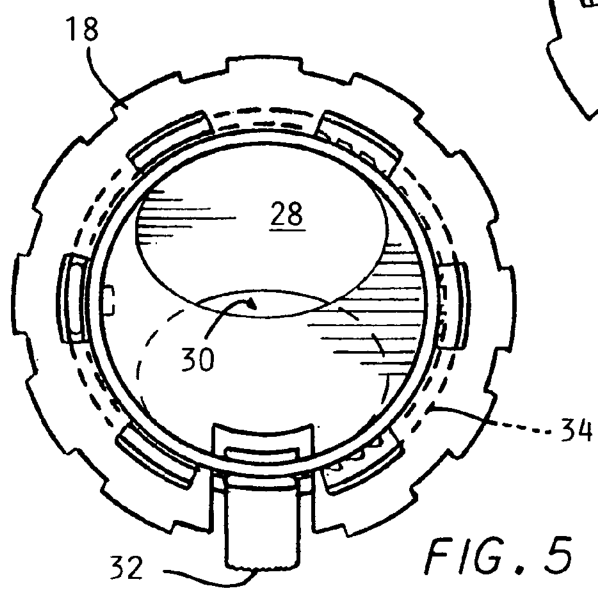
FIG. 5 is a top view of the clamping device shown in FIG. 4 with the inner and outer members relatively rotated 180° to, the minimum through opening position.

In use, the members 14, 16 are rotated to the fully open position seen in FIGS. 4 and 6.

After insertion of the rope segments into the through opening defined through the holes 28, 30, the members 14, 16 are relatively rotated in a clockwise direction to reduce the through opening size by progressive misalignment of the holes 28, 30 until the rope segments are tightly compressed by the hole edges as seen in FIG. 7 or 8. Different size ropes can be clamped within a predetermined range by greater or lesser rotation of members 14, 16.

The ratchet teeth 36, 38 override when the members 14, 16 are relatively rotated in that direction but immediately lock together upon release of the members preventing any attempted counter rotation so that the members 14, 16 are locked together with the rope segments 12A tightly clamped.

By compressing the release button 32 as with one finger when gripping the rim, the ratchet teeth 36, 38 are released as seen in FIG. 9, allowing counter rotation to the release condition of FIG. 6.

The clamp device described is simple and rugged but highly reliable in operation, providing great convenience in securing or releasing lines on a boat, guy lines on a tent, tying down a load with a rope, etc.

The invention claimed is:

1. A rope or line clamping device comprising:

a first and second generally tubular members at least partially overlapping and interfit with each other so as to be relatively rotatable about a common axis while being held together as an assembly;

a hole formed in an internal web of each member, the webs being juxtaposed next to each other and the holes offset from the axis of relative rotation of the members, the holes overlying each other in rotative positions of the members, said holes being misaligned to an increasing extent upon continued relative rotation of the members in one direction;

a ratchet mechanism acting between the two members allowing rotation in only said one direction so that two rope or line segments passed through both holes are clamped together as said members are relatively rotated to reduce the size of a through opening defined by the degree of overlap of the two respective holes and held by operation of said ratchet mechanism including a pawl movable to release said ratchet mechanism and allow reverse relative rotation of said members to release said rope or line segments;

said ratchet mechanism comprising one of said members formed with a series of ratchet teeth extending inwardly and partially about an inner circumferential wall thereof, said pawl normally urged outwardly to bring into engagement with said ratchet teeth, said ratchet teeth angled so as to allow relative rotation of said members only in said one direction;

said pawl comprising an integrally formed feature on the other member connected thereto by a bendable leg, said pawl having a portion protruding out radially from a perimeter of said outer member to enable finger pressure to deflect said pawl element radially inward to disengage said pawl one or more ratchet teeth from said ratchet teeth on said one member.

2. The device according to claim 1 wherein said two members are molded of plastic and snap fit together by interfit portions which are captured upon assembly of the two members by relative axial motion after being aligned with each other.

3. The device according to claim 2 wherein said interfit portions comprise a rim on the perimeter of one member and a circumferential groove in the other.

4. The device according to claim 1 wherein said first and second members are molded from plastic and said ratchet teeth on said pawl and one member are both integrally formed as a part of said respective members.

5. The device according to claim 1 wherein said hole in said internal web of each member are each of an elongated shape to better conform generally to two rope or line segments inserted through said holes aligned in the direction of said elongated shape.

6. The device according to claim 5 wherein said holes are equally sized ovals.

7. The device according to claim 4 wherein an exterior surface of each member is ribbed.

* * * * *